United States Patent [19]
Caspers

[11] Patent Number: 4,492,915
[45] Date of Patent: Jan. 8, 1985

[54] METHOD AND APPARATUS FOR THE ELECTRONIC MEASUREMENT OF THE THICKNESS OF VERY THIN ELECTRICALLY CONDUCTIVE FILMS ON A NONCONDUCTIVE SUBSTRATE

[75] Inventor: Friedhelm Caspers, Bochum, Fed. Rep. of Germany

[73] Assignee: Elektro-Physik & Erich Steingroever, Fed. Rep. of Germany

[21] Appl. No.: 352,189

[22] Filed: Feb. 25, 1982

[30] Foreign Application Priority Data

Feb. 28, 1981 [DE] Fed. Rep. of Germany ....... 3107675

[51] Int. Cl.³ ............................................. G01R 27/04
[52] U.S. Cl. ........................ 324/58.5 R; 324/58.5 A; 324/58.5 B
[58] Field of Search ..................... 324/58.5 R, 58.5 A, 324/58.5 B, 58.5 C, 61 R; 73/620, 627

[56] References Cited

U.S. PATENT DOCUMENTS

| 3,710,243 | 1/1973 | Keenan | 324/58.5 B |
| 3,936,736 | 2/1976 | Ray | 324/58.5 B |

FOREIGN PATENT DOCUMENTS

| 2144472 | 5/1973 | Fed. Rep. of Germany | 324/58.5 A |
| 0589571 | 1/1978 | U.S.S.R. | 324/58 A |
| 0647619 | 2/1979 | U.S.S.R. | 324/58 A |

OTHER PUBLICATIONS

Rzepecka: "Non-Contact Measurement of Metal Tape Thickness Using MW Instrumentation"—Journal of Microwave Power—vol. 6—No. 1—1971—pp. 5–14.
Lorrain et al.: "Electromagnetic Fields and Waves'"—1962, Freeman and Co.—pp. 532–540.
Beyer et al.: "Microwaves Thickness Detector"—The Review of Scientific Documents—Mar. 1960—pp. 313–316.
Olszewski and Cormack, "Contactless Measurement of Conductivity of Metals and . . .", IEEE Transactions on Instrument and Measurement, vol. IM-25, No. 3, (Sep. 1976), pp. 186–190.
Sterkov and Tokarev, "Measuring the Thickness and Conductance of Thin Films in the Course of Their Deposition", Izmeritel 'naya Tekhnika, No. 4, pp. 45–47, (Apr. 1974).
Hadley and Denisson, "Reflection and Transmission Interference Filters", Journal of the Optical Society of America, vol. 37, No. 6, (Jun. 1947), pp. 451–465, 459.

*Primary Examiner*—Stanley T. Krawczewicz
*Assistant Examiner*—Jose M. Solis
*Attorney, Agent, or Firm*—Fisher, Christen & Sabol

[57] ABSTRACT

The invention concerns a method for measuring the thickness of very thin, electrically conducting films of the order of 1 to 1000 nanometers and measuring apparatus for performing the method. The thickness of the electrically conducting films is measured by means of high-frequency electromagnetic waves in the microwave range by use of the surface resistance and consideration of the conductivity of the film as a measure of the film thickness. The thickness determination makes use of the reflection factor and/or the transmission factor of the microwave on the conductive film. This can be done with the aid of two antennas in free space in the far field of these antenna arrangements or, if the antennas are designed as waveguide flanges, it can also be done in the near field, in which case the waveguide flanges are arranged opposite each other at a very small distance.

24 Claims, 4 Drawing Figures

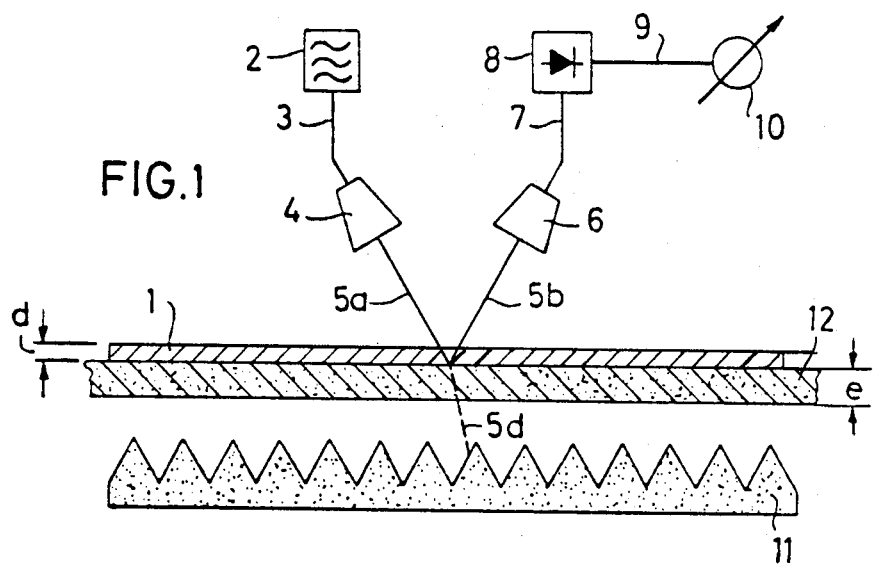
FIG.1
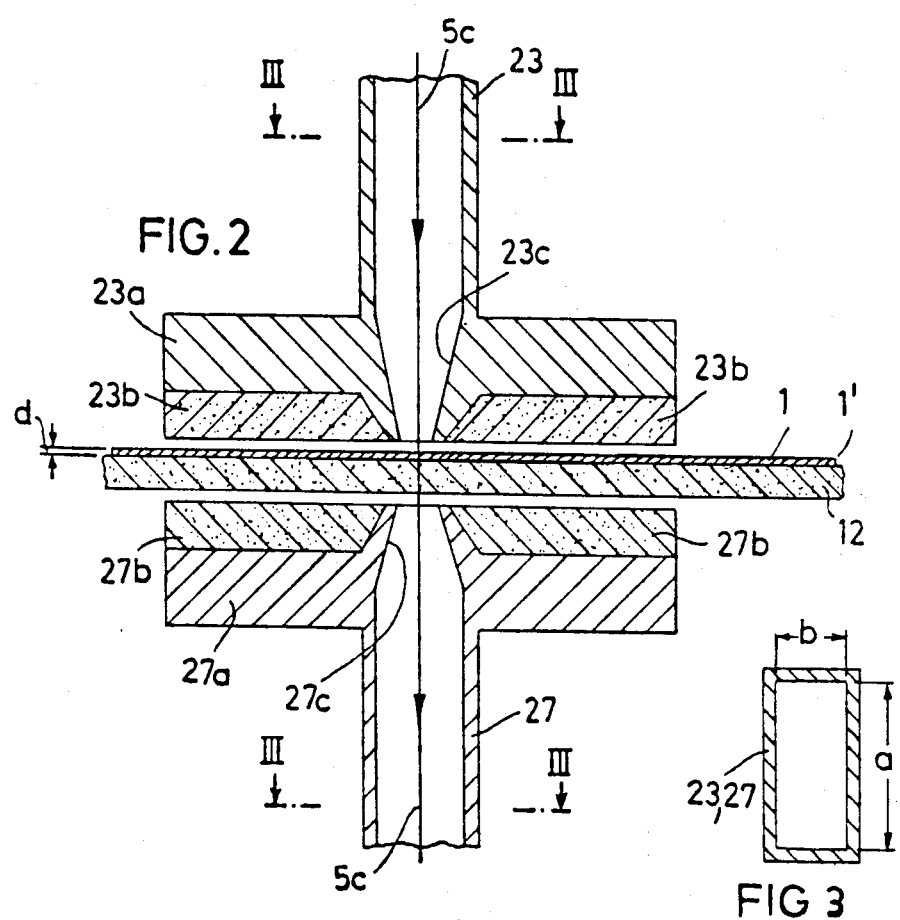
FIG.2
FIG 3

METHOD AND APPARATUS FOR THE ELECTRONIC MEASUREMENT OF THE THICKNESS OF VERY THIN ELECTRICALLY CONDUCTIVE FILMS ON A NONCONDUCTIVE SUBSTRATE

BACKGROUND OF THE INVENTION

The invention concerns a method for the electronic measurement of the thickness of very thin, electrically conductive films on nonconductive base material and apparatus for performing these measurements.

Direct mechanical measuring methods are no longer practical for measuring film thicknesses of less than 1 micron. Optical interference methods sometimes require considerable adjustment work and can be unacceptably affected by disturbing factors, such as the base material which supports the electrically conducting film. Electromagnetic eddy-current methods for determining the surface resistance of a very thin metallic film on a supporting foil are highly sensitive to inexact adjustment under certain circumstances. Measurement involving contact with the film usually cannot be performed due to the danger of damage to the film.

According to Olszewski and Cormack, "Contactless Measurement of Conductivity of Metals and . . . ", IEEE Transactions on Instrumentation and Measurement, Vol. IM-25, No. 3, September 1976, pp. 186–190, a time-domain eddy-current method is known, which, however, can be used only for metallic film thicknesses of 0.1 to 50 $\mu$m.

According to Sterkhov and Tokarev, Measuring the Thickness and Conductance of Thin Films in the Course of Their Deposition, Izmeritel 'naya Tekhnika, No. 4, pp. 45–47, April 1974, a single open waveguide, whose aperture is covered with a dielectric plate, which in the course of the vapor depositions process is coated with the metallic film that is to be measured, can be used to measure the reflection factor arising in this way. However, the method is very imprecise in this way, with measuring errors of up to 30%, because in the extreme near field of a (unilaterally) open waveguide very complicated field conditions prevail, which are simplified if either a distance of at least a few wavelengths from the aperture is maintained or the waveguide continues on the other side of the film.

SUMMARY OF THE INVENTION

The invention is based on the need to develop a relatively simple and accurate method for electronically measuring the thickness of very thin, electrically conducting films and apparatus for performing this measuring method, which are suitable for electrically conducting films, especially metallic films in the thickness range of 1 to about 1000 nanometers.

This problem is solved in accordance with the invention by measuring the surface resistance of the electrically conductive film and thus the thickness of the film, whose conductivity is known, with two general antennas and with the use of the transmission factor and/or the reflection factor of the microwave on the conductive films.

When the conductivity "k" is known, the surface resistance $R_F$ is directly related to the film thickness "d", measured in meters, of the film which is to be measured according to the following equation:

$$R_F \Omega \square = \frac{1}{k \left[ \frac{1}{\Omega m} \right] \cdot d} \quad (1)$$

The reflection factor "r" of a plane homogeneous wave of perpendicular incidence on a resistance film in free space is, according to equation (1), L. N. Hadley, D. M. Denisson, Reflection and Transmission Interference Filters, Journal of the Optical Society of American, Vol. 37, No. 6, June 1947, pp. 451–465, 459:

$$r = \frac{-Z_o}{Z_o + 2R_F} \quad Z_o = 377\Omega \quad (2)$$

where $Z_o$ is the free space impedance.

The transmission factor "t" is:

$$t = \frac{2R_F}{Z_o + 2R_F} \quad (3)$$

In the case of oblique incidence it is necessary to distinguish two cases of possible polarization, namely, the case in which the vector of the electric field strength is perpendicular to the plane fixed by the propagation vector and the surface normals of the film ($r_s$) and the case in which the vector of the electric field strength is parallel to this plane ($r_p$):

$$r_s = \frac{-Z_o}{2R_F \cdot \cos\phi + Z_o} \quad (4)$$

$$r_p = \frac{-Z\cos\phi}{2R_F + Z_o \cdot \cos\phi} \quad (5)$$

The angle "$\phi$" is the angle between the surface normal of the film and the propagation vector of the electromagnetic wave. For metallic film thicknesses with $R_F \geq 100$ ohm measurement of the reflection factor is more advantageous, while measurement of the transmission factor is advisable for values of $R_F \leq 100$ ohm.

The transmission factor of the metallic film can be measured in free space, for example, by determination of the transmission attenuation between two microwave antennas (e.g., horn antennas) when the test object is inserted between them. Similarly, standard methods which are well known in microwave technology can be used to measure the reflection factor of the test object (e.g., metallic film on supporting foil), which is taken to be very larged in comparison to the radiation lobe of the antennas.

At this point special mention should be made of the fact that for metallic film thicknesses which are small compared to the skin depth of the electromagnetic wave, the reflection and transmission factor do not depend on the frequency. A thin dielectric supporting foil for the metallic film can also be considered negligible in a very good approximation if its thickness is small compared to the wavelength. If the surface area of the test object is only a few square centimeters, it is advisable to perform the transmission (or reflection) measurement by placing the test object between two waveguide flanges, which are pressed against the two opposite sides of the test object or, if contactless measurements are to be made, are brought to within a few microns of the surface of the test object.

In order to suppress surface waves, the waveguide flanges are either made entirely of highly dissipative material or coated with highly dissipative material on their front surfaces, or in order to avoid air gaps, covered with a material such as is used for waveguide flange gaskets and which has the properties of certain conductivity and elasticity.

The reflection or transmission factor measurable with apparatus of this type is a direct measure of the surface resistance $R_F$ and thus of the metallic film thickness "d". Measurement at a single frequency is sufficient for determination of the reflection or transmission factor. If this test frequency is 35 GHz, for example, then we have a measuring surface of about 3 by 8 mm when rectangular waveguides are used. For film thicknesses of the order of 0.01 μm the surface resistance $R_F$ is a few ohms and the transmitted power is, with good approximation, inversely proportional to the square of the metallic film thickness "d".

If the electrically conducting film to be measured is present only in the form of narrow strips a few millimeters wide on plastic supporting foil, as is the case, for example, in condenser production, the measuring surface can be reduced by reducing the height of the clear waveguide cross section by means of a suitable transition piece, while the propagating capacity of the fundamental wave is maintained. The lower cutoff frequency of the propagable fundamental mode, e.g., the $H_{10}$ wave of the rectangular waveguide, is not affected by this measure. Since in the case of test objects in the form of narrow strips there is the danger of undesired coupling between the transmitting and receiving waveguide flange by means of surface waves of the metallic foil film and diffraction at the edge of the strip, reduction of the waveguide height is especially advisable here. In this regard, in order to achieve better measuring results, the longer side of a rectangular waveguide cross section should be arranged parallel to the edge of the strip. In general, the surface resistance $R_F$ of a very thin metallic film can be determined if the film is arranged between any two openings of waveguide systems (transmission method) or is located near an opening or aperture of a waveguide system (reflection method). Of course, normally there is then no longer any simple relationship between the surface resistance and electromagnetic signals which are available for a measurement.

Preferred embodiments of apparatus for performing the measuring method of the invention are shown schematically in the drawings.

BRIEF DESCRIPTION OF THE DRAWINGS

FIG. 1 shows, schematically, a first embodiment of a contactless measuring device with horn antennas which operates by the reflection principle.

FIG. 2 shows, schematically, a modified form of a measuring device which operates by the waveguide principle.

FIG. 3 shows a section through line III—III in FIG. 2 through each of the two waveguides.

DETAILED DESCRIPTION OF THE INVENTION

Figure 4:
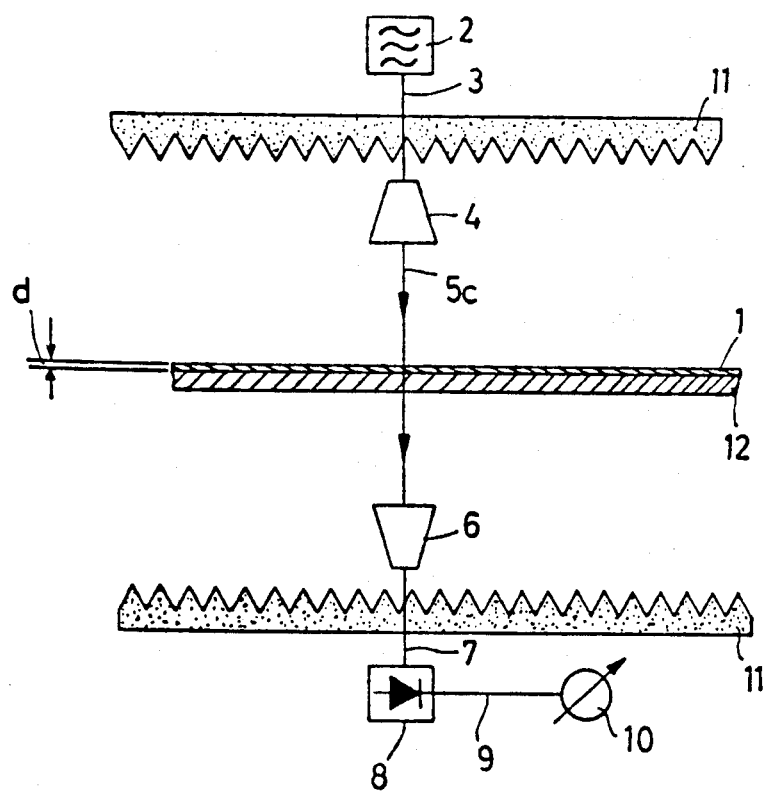
FIG. 4 shows, schematically, another modified embodiment of a measuring device with two horn antennas which operates by the transmission principle.

The apparatus shown schematically in FIG. 1 for measuring the thickness "d" of an electrically conducting film 1, e.g., semiconductor material, or of a metallic film on a nonconducting support material 12 of thickness "e" consists of a microwave generator 2, which operates at a frequency of, for example, 35 GHz, and which is connected with a horn-shaped transmitting antenna 4 via a waveguide 3. A microwave beam 5a is directed from the horn-shaped transmitting antenna 4 onto the film 1 which is to be measured, and it is reflected from this film with a certain reflection factor "r". The microwave beam 5b is reflected from the film 1 to a receiving antenna 6, which is also horn-shaped and which is connected via a waveguide 7 with a receiver or detector 8, which in turn is connected to an indicating device 10 via a line 9. The indicator 10 is calibrated in thickness units of the film 1 which is to be measured. An absorber mat 11, which absorbs all high-frequency energy of the microwave beam 5d that penetrates all the way through the film 1, is located under the material 12 that supports the film 1 which is to be measured.

In each measurement component 5b of microwave 5a which is reflected from the film 1 reaches the receiving antenna 6 and is rectified in the receiver or detector 8 by a diode. The modulated signal, i.e., the envelope of the high-frequency oscillation, is then analyzed as a test signal for rectification and amplification. The power of the received signal before demodulation is directly related to the thickness "d" of the electrically conducting layer 1 which is to be measured, if this layer is a film (cf. equations (2) and (3)). Diodes operating in this frequency range normally have a quadratic characteristic in low-power signal behavior, i.e., the LF output voltage is proportional to the HF input power, which must be given due consideration in analyzing the metallic film thickness.

FIG. 2 shows a modified version of the measuring apparatus in FIG. 1, in which the film to be measured 1 is arranged on a nonconducting support material 12 in the region of the measuring apparatus. The system can operate in this configuration either for transmission measurement or reflection measurement; transmission measurement is preferred for $R_F < 100$ ohm, which is probably the case in most practical applications. By virtue of the fact that the two antennas in the form of waveguide flanges are separated by a very small distance (a few tens of microns), the field of the fundamental mode (e.g., $H_{10}$) is not disturbed very much, and, in contrast to unilateral reflection measurement (Sterkhov), simple field conditions are present in a good approximation because the $H_{10}$ wave can be represented as the superposition of two plane homogeneous waves, for which the reflection and transmission factors are given in equations (2) to (5).

The measuring apparatus in FIG. 2 consists of two waveguides 23, 27 with rectangular cross sections and with waveguide flanges 23a, 27a, which are pressed against the opposite sides of the combination of conducting films 1 and support material 12 or which are brought to within a distance of a few microns of this combination. A microwave beam 5c penetrates the film 1 and the nonconductive support material 12. In order to suppress surface waves, the waveguide flanges 23a, 27a are covered with a highly dissipative lossy material 23b, 27b for high-frequency oscillations in the microwave range, such as conductive rubber or plastic, barium titanite or cross-linked polyurethanes or their intermediates in the form of foamed plastics, such as those which are known commercially under the protected trademark "Eccosorb". However, the waveguide flanges 23a, 27a can also consist of or be covered with a different HF attenuating material.

In order to reduce the measuring surface, the height of the rectangular waveguide cross section FIG. 3 is reduced by a transition piece 23c, 27c, which tapers towards the film 1 which is to be measured; the system is set up in much a way that the longer side "a" of the rectangular waveguide cross section extends parallel to the edge 1' of the film 1, while the shorter side "b" is perpendicular to the edge of the strip.

Finally, FIG. 4 shows another modification of the apparatus, in which two horn antennas are used instead of the waveguide flanges. The two horn antennas 4, 6, which are separated by a minimum distance of a few "λ", but which are preferably in the far field, are arranged above and below the film 1 which is to be measured and which is supported by a nonconducting support material 12. The apparatus for measuring the thickness "d" of the electrically conductive film 1 consists of a microwave generator 2, which, like the example shown in FIG. 1, operates at a frequency of, for example 35 GHz and is connected with the horn-shaped transmitting antenna 4 via a waveguide 3. The horn-shaped transmitting antenna 4 directs a microwave beam 5c onto the film 1 which is to be measured. The microwave beam 5c penetrates the film 1 and hits a receiving antenna 6, which is also horn-shaped and which is connected via a waveguide 7 with a receiver or detector 8. The detector 8 is connected by a line 9 to an indicating device 10, which is preferably calibrated in thickness units of the electrically conducting film 1 which is to be measured.

Two absorber mats 11 are located on either side of the two horn antennas 4 and 5; they absorb all high-frequency energy of the microwave beam 5c which is radiated by the measuring apparatus.

In the following claims it should be understood that the word "film" includes, but is not limited to, a metal foil such as gold, silver, or aluminum foil adhesively applied to a rigid base, such as a sheet of glass or synthetic plastic.

The word "film" is also intended to cover any thin metallic layer such as a metallic material vacuum deposited upon plastic foils or substrates such as is used in the manufacture of capacitors, and digitally recorded audio or video records, or other articles.

Also included as a "film" would be the thickness of the layer of ion implantation in semiconductive layers used in the production of integrated circuits.

I claim:

1. Method for the electronic measurement of the thickness of very thin electrically film supported on a nonconductive base, the thickness of said film being within the range of between 1 and 1000 nanometers and the conductivity of which is known, comprising the steps of: subjecting said film to a beam of microwave energy directed toward the film by a microwave transmitting means; receiving by microwave receiving means a portion of said microwave beam reflected by said film and measuring an output value of said microwave receiving means as a factor indicative of the surface resistance of said film.

2. Method according to claim 1, wherein said microwave transmitting and receiving means are located on the same side of said film and the value measured is the reflection factor.

3. Method according to claim 1, wherein said microwave transmitting and receiving means are located on respective opposite sides of said film and supporting base and the value measured is the transmission factor.

4. Method according to claim 1, wherein the area of the film to be measured is in the range of only a few square centimeters, and said microwave transmitting and receiving means comprises two aligned wave guides disposed on respective opposite sides of said film and supporting base, said wave guides being provided with flanges disposed closely adjacent to said film and supporting base.

5. Method according to claim 4, wherein said flanges are in contact respectively with the surfaces of said film and supporting base.

6. Method according to either one of claims 4 or 5, wherein the surfaces of said flanges facing said film and supporting base include a highly dissipative lossy material for suppressing surface waves.

7. Method according to claim 6 wherein said highly dissipative material is selected from the group consisting of conductive rubber, plastic or barium titanate.

8. Method according to claim 1, wherein a portion of said beam of microwave energy directed towards the film is reflected by the film and another portion of said beam is transmitted through the film: whereby the thickness of the film may be selectively measured by a measurement of the reflection factor; said reflection factor being measured when the surface resistance of the film is equal to, or greater than, 100 ohm.

9. Method according to claim 8, wherein said measurements of the reflection factor are performed in free space by disposing said film in the path of a microwave beam confined within a wave guide.

10. Apparatus for the electronic measurement of the thickness of very thin electrically conductive films supported on a nonconductive base, the thickness of the film being within the range of between 1 and 1000 nanometers and the conductivity of which is known, comprising: a pair of aligned rectangular wave guides, the opposite end of the one said wave guide being connected to a microwave transmitting means and the opposite end of the other said wave guide being connected to a microwave receiving means; said film and supporting film and supporting base to be disposed to a microwave propagating from said transmitting means through said wave guides to said receiving means by positioning said film and supporting base between said open ends of the wave guides facing each other in a plane transverse to the axis of the wave guides; and electronic means for measuring an electrical output value of said microwave receiving means; said electrical output value corresponding to the microwave beam received by said receiving means;

whereby said electrical output value is processed by said electronic means to represent a value corresponding to the thickness of said film.

11. Apparatus according to claim 10, wherein said supporting base is coated with strips of said film; the width of the strips being smaller than either dimension of said wave guides transverse to the axis of the wave guides:

said open ends of the wave guides facing each other being provided with at least one pair of oppositely disposed internal walls convergently tapered towards the open space between the wave guides to confine the cross-section of said microwave beam to the surface of any of said strips.

12. Apparatus according to claim 11, wherein said strip is to be disposed in said open space with said one transverse dimension spanning the space between said internal walls.

13. Apparatus according to any one of claims 10, 12 or 11, wherein the dimensions of the flanges on said open ends of the wave guides facing each other transverse to the axis of the wavelength of the microwave for the suppression of stray microwaves.

14. Apparatus according to claim 13, wherein the facing surfaces of said flanges include a highly dissipative lossy material for suppressing surface waves.

15. Apparatus according to claim 14, wherein said highly dissipative material is selected from the group consisting of conductive rubber, plastic or barium titanate.

16. Method for the electronic measurement of the thickness of very thin electrically conductive film supported on a nonconductive base, the thickness of said film being within the range of between 1 and 1000 nanometers and the conductivity of which is known, comprising the steps of: subjecting said film to a beam of microwave energy directed toward the film by a microwave transmitting means; receiving by microwave receiving means a portion of said microwave beam transmitted through said film and measuring an output value of said microwave receiving means as a factor indicative of the surface resistance of said film.

17. Method according to claim 16, wherein said microwave transmitting and receiving means are located on the same side of said film and the value measured is the reflection factor.

18. Method according to claim 16, wherein said microwave transmitting and receiving means are located on respective opposite sides of said film and supporting base and the value measured is the transmission factor.

19. Method according to claim 16, wherein the area of the film to be measured is in the range of only a few square centimeters, and said microwave transmitting and receiving means comprises two aligned wave guides disposed on respective opposite sides of said film and supporting base, said wave guides being provided with flanges disposed closely adjacent to said film and supporting film.

20. Method according to claim 19, wherein said flanges are in contact respectively with the surfaces of said film and supporting base.

21. Method according to either one of claims 19 or 20, wherein the surfaces of said flanges facing said film and supporting base include a highly dissipative lossy material for suppressing surface waves.

22. Method according to claim 21 wherein said highly dissipative material is selected from the group consisting of conductive rubber, plastic, or barium titanate.

23. Method according to claim 16, wherein a portion of said beam of microwave energy directed towards the film is reflected by the film and another portion of said beam is transmitted through the film: whereby the thickness of the film may be selectively measured by a measurement of the transmission factor; said transmission factor being measured when the surface resistance of the film is equal to, or less than, 100 ohm.

24. Method according to claim 23, wherein said measurements of the transmission factor are performed in free space by disposing said film in the path of a microwave beam confined within a wave guide.

* * * * *